(12) United States Patent
Kang

(10) Patent No.: US 10,495,242 B2
(45) Date of Patent: Dec. 3, 2019

(54) GROOVED JOINT ADAPTER

(71) Applicant: Tai Ho Kang, Seoul (KR)

(72) Inventor: Tai Ho Kang, Seoul (KR)

( * ) Notice: Subject to any disclaimer, the term of this patent is extended or adjusted under 35 U.S.C. 154(b) by 129 days.

(21) Appl. No.: 15/716,898

(22) Filed: Sep. 27, 2017

(65) Prior Publication Data

US 2019/0072216 A1    Mar. 7, 2019

(30) Foreign Application Priority Data

Sep. 4, 2017    (KR) ........................ 10-2017-0112757

(51) Int. Cl.
| | |
|---|---|
| *F16L 21/06* | (2006.01) |
| *F16L 17/06* | (2006.01) |
| *F16L 21/03* | (2006.01) |
| *F16L 21/04* | (2006.01) |
| *F16L 23/04* | (2006.01) |
| *F16L 21/00* | (2006.01) |

(52) U.S. Cl.
CPC ............ *F16L 21/06* (2013.01); *F16L 17/06* (2013.01); *F16L 21/007* (2013.01); *F16L 21/03* (2013.01); *F16L 21/04* (2013.01); *F16L 23/04* (2013.01)

(58) Field of Classification Search
CPC ......... F16L 21/06; F16L 17/06; F16L 19/086; F16L 37/091; F16L 19/08; F16L 37/02; F16L 37/12
USPC ....... 285/331, 335, 337, 339, 343, 374, 399, 285/412, 421
See application file for complete search history.

(56) References Cited

U.S. PATENT DOCUMENTS

| | | | | |
|---|---|---|---|---|
| 5,398,980 | A * | 3/1995 | Hunter .................... | F16L 21/04 285/337 |
| 7,878,555 | B2 * | 2/2011 | Oh ........................ | F16L 19/086 285/319 |
| 2011/0210543 | A1 * | 9/2011 | German ................ | F16L 21/007 285/337 |

FOREIGN PATENT DOCUMENTS

| | | |
|---|---|---|
| KR | 20-0307128 Y1 | 3/2003 |
| KR | 10-1508659 B1 | 4/2015 |

* cited by examiner

*Primary Examiner* — Anna M Momper
*Assistant Examiner* — William S. Choi
(74) *Attorney, Agent, or Firm* — Rabin & Berdo, P.C.

(57) ABSTRACT

A grooved joint adapter includes a cylindrical body having an insertion port formed in one end, a groove formed in an outer peripheral surface of the other end, a guide portion formed on an interior thereof, first coupling portions on both outer surfaces thereof, and a fixing portion protruding from an inner peripheral surface thereof. A pipe socket has second coupling portions on both outer surfaces and a protrusion formed on one surface. A pressure ring is disposed on an insertion port side and has both ends separated from each other. A stopper ring is disposed inside of the guide portion, and has both ends separated from each other and one or more wedge sawteeth on an inner peripheral surface. A rubber ring is disposed inside of the cylindrical body, and has an uneven portion on an inner peripheral surface and a stopper portion protruding inward.

5 Claims, 6 Drawing Sheets

GROOVED JOINT ADAPTER

CROSS REFERENCE TO RELATED APPLICATION

The present application claims priority from Korean Patent Application Number 10-2017-0112757 filed on Sep. 4, 2017, the entire contents of which are incorporated herein for all purposes by this reference.

BACKGROUND

Field

The present disclosure relates to a grooved joint adapter, and more particularly, to a grooved joint adapter able to temporarily connect two pipes in a lengthwise direction thereof.

Description

Pipe joints are categorized as permanent joints and temporary joints. Generally, permanent joints are formed using a welding system. Temporary joints, on the other hand, can be used in a place in which a pipe is to be attached or a place from which a pipe is to be detached. Temporary joints typically use a grooved joint.

That is, grooves may be formed in the ends of two aligned pipes using a grooving machine, and then, the two aligned pipes may be connected in a lengthwise direction of a grooved joint using the grooved joint. The grooved joint will be described in more detail with reference to Patent Document 1.

According to Patent Document 1, the grooved joint includes a ring gasket sealing a gap between two pipes and preventing leakage of fluid; and a joint coupling including the ring gasket therein, having both ends thereof coupled to grooves formed in ends of the two pipes, and connecting the two pipes in a lengthwise direction of the grooved joint.

The joint coupling has two semicircular portions which may be separated from each other. The two semicircular portions may be coupled using a combination of a nut and a bolt, i.e. by fastening the nut and the bolt, thereby easily maintaining a connection between the two pipes, even in the case that external force or a load is applied to the two pipes.

However, in related art inventions, including Patent Document 1, the grooved joint has a problem in that grooves should be formed in the ends of pipes before the pipes are connected.

That is, in order to form grooves in the ends of pipes, for example, an operation should be performed at a work site using a grooving machine disclosed in Patent Document 2. Since the operation is performed at a work site, inconvenience may occur due to various conditions, and processing costs and transport charges may be increased.

In addition, a groove processing operation requires a degree of workmanship high enough for an expert to have difficulty in performing such a groove processing operation. Accordingly, the grooved joint has problems in that construction costs are high, while formability and productivity are low.

Related Art Document

Patent Document 1: Korean Patent Registration No. 10-1508659

Patent Document 2: Korean Utility Model Registration No. 20-0307128

BRIEF SUMMARY

Various aspects of the present disclosure provide a grooved joint adapter able to connect two pipes formed from various materials and having various shapes such as a linear shape, a T shape, and a curved shape, without forming grooves in ends thereof.

According to an aspect, a grooved joint adapter may include: a cylindrical body having an insertion port formed in one end thereof, such that an end of a connection pipe is inserted into the insertion port, a groove formed in an outer peripheral surface of the other end thereof, a guide portion defined by an interior thereof to spread downwardly in a diagonal direction and connected to the insertion port, first coupling portions formed on both outer surfaces thereof, and a fixing portion protruding from an inner peripheral surface thereof; a pipe socket having second coupling portions formed on both outer surfaces thereof, such that the first coupling portions are bolt-coupled to the second coupling portions, and a protrusion formed on one surface thereof and inserted into the cylindrical body through the insertion port; a pressure ring disposed on a portion of the cylindrical body, adjacent to the insertion port, and having both ends separated from each other, wherein the pressure ring slides toward the fixing portion along the guide portion through the protrusion when the first and second coupling portions are bolt-coupled; a stopper ring disposed inside of the guide portion, having both ends separated from each other, and having one or more wedge sawteeth formed on an inner peripheral surface thereof in a diagonal direction thereof to grip an outer peripheral surface of the connection pipe, wherein the stopper ring slides along the guide portion when the pressure ring slides through the protrusion; and a rubber ring disposed inside of the cylindrical body, having an uneven portion formed on an inner peripheral surface thereof, and having a stopper portion protruding inward and closely contacting the end of the connection pipe, wherein the rubber ring expands while being compressed to grip the connection pipe.

In the grooved joint adapter, a diameter of the one end of the cylindrical body, in which the insertion port is formed, may be greater than the diameter of the other end of the cylindrical body, in which the groove is formed.

In the grooved joint adapter, the one or more wedge sawteeth may be provided as two or more wedge sawteeth and may be disposed in opposite directions.

The grooved joint adapter may further include: a leakage prevention ring interposed between the cylindrical body and the pipe socket; a rubber-ring cover ring interposed between the cylindrical body and the rubber ring; and a rubber-ring compression ring interposed between the rubber ring and the stopper ring.

In the grooved joint adapter, the connection pipe may include a linear pipe, a T-shaped pipe, or a curved or bent pipe including an elbow.

In the grooved joint adapter, the cylindrical body and the pipe socket may be formed by casting cast iron, steel, or stainless steel.

In the grooved joint adapter, the stopper ring, the pressure ring, and the rubber-ring compression ring may be formed from stainless steel.

The above and other objects, features and advantages of the present will be more clearly understood from the following detailed description when taken in conjunction with the accompanying drawings.

In the meantime, terms and words used in the description and the claims should not be interpreted as having ordinary or dictionary meanings, but as meanings and concepts conforming to the technical spirit of this invention based on the principle that an inventor may properly define the concept of the terms at his own discretion in order to describe the invention in the best manner possible.

According to an embodiment of the present disclosure, two connection pipes can be easily connected without forming grooves in ends thereof using a grooving machine, so that formability and productivity can be excellent and costs can be reduced.

Furthermore, according to an embodiment of the present disclosure, since grooving is not performed on pipes, connection pipes formed from different materials can be easily connected when outer diameters thereof match each other. Accordingly, the present disclosure is very effective in terms of construction convenience.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
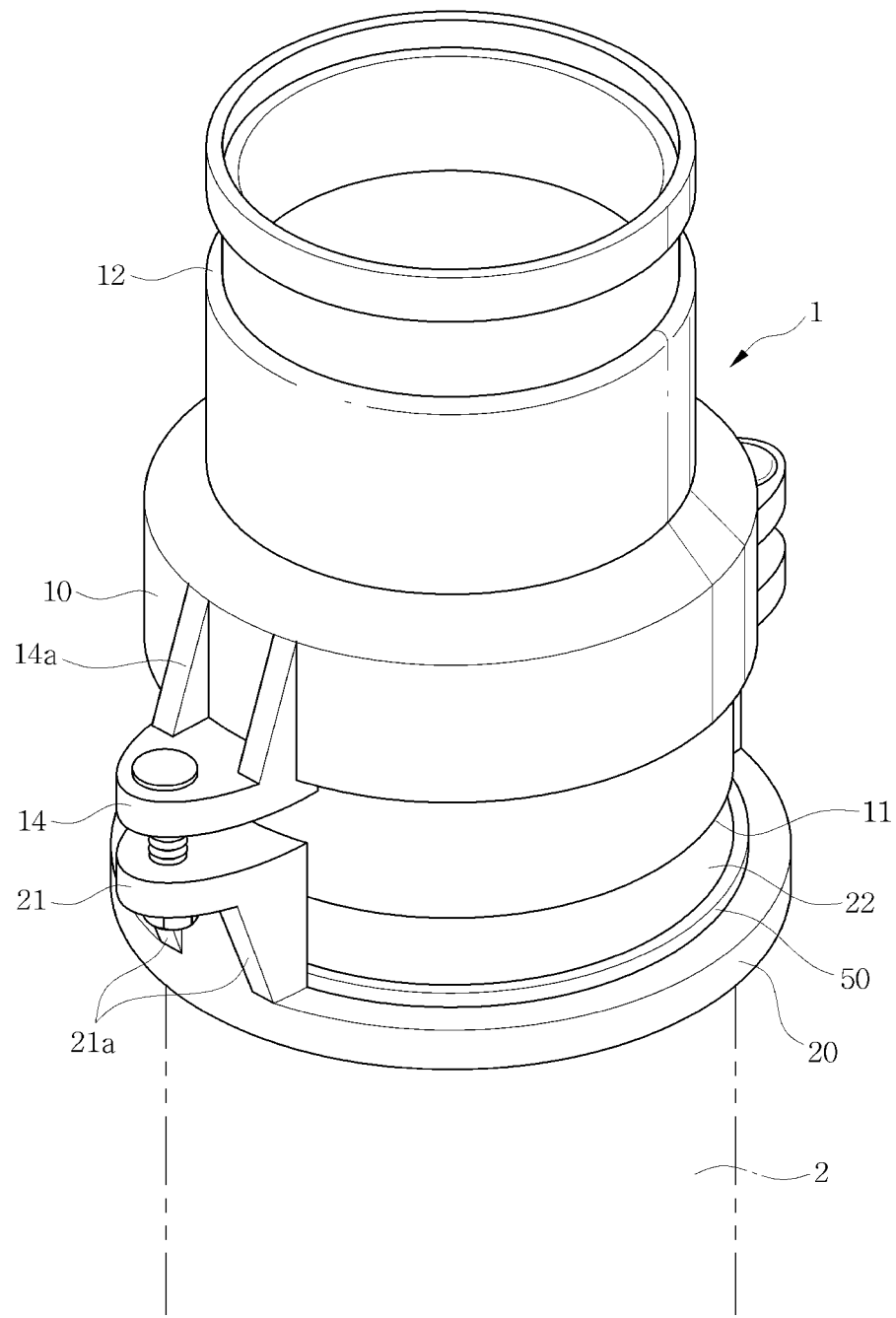
FIG. 1 is a perspective view illustrating a grooved joint adapter according to an exemplary embodiment of the present disclosure.

Reference will now be made in detail to the present disclosure, embodiments of which are illustrated in the accompanying drawings. Reference should be made to the drawings, in which the same reference numerals and signs may be used throughout the different drawings to designate the same or similar components. In the following description of the present invention, detailed descriptions of known functions and components incorporated herein will be omitted in the case that the subject matter of the present invention is rendered unclear thereby.

It will be understood that, although terms "first," "second," "A," "B," "(a)," "(b)," etc. may be used herein to describe various elements, these terms are only used to distinguish one element from another element. The substance, sequence or order of these elements is not limited by these terms. It will be understood that when an element is referred to as being "connected to" or "coupled to" another element, not only can it be "directly connected" or "coupled to" the other element, but also can it be "indirectly connected or coupled to" the other element via an "intervening" element.

Hereinafter, exemplary embodiments of the present disclosure will be described in detail with reference to the accompanying drawings.

FIG. 1 is a perspective view illustrating a grooved joint adapter 1 according to an exemplary embodiment of the present disclosure, in which a pipe socket 20 is bolt-coupled to the lower portion of a cylindrical body 10 via first and second coupling portions 14 and 21, and pipes are connected via the pipe socket 20. Hereinafter, the pipes connected via the pipe socket 20 will be referred to as "connection pipes."

Figure 2:
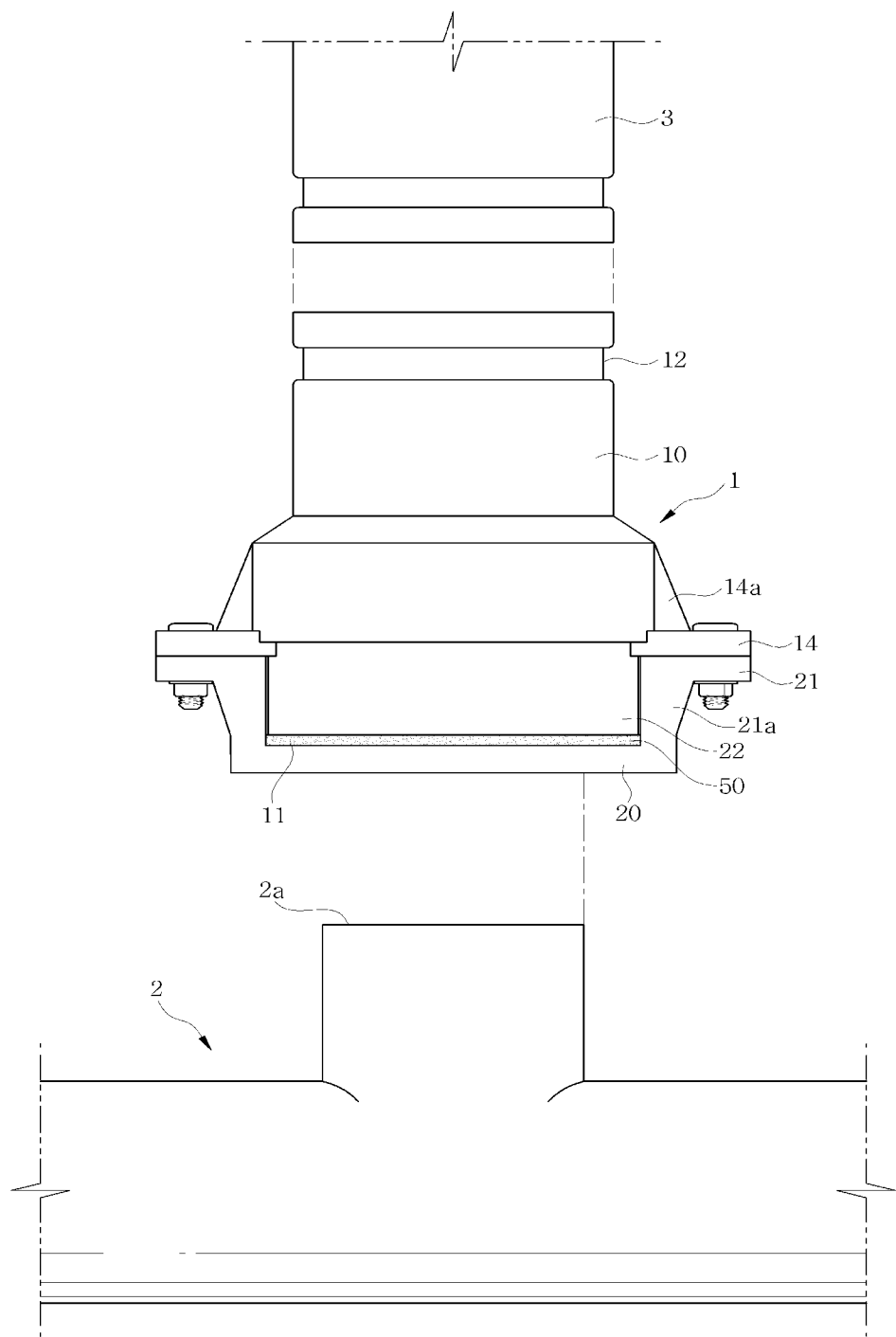
FIG. 2 is an elevation view illustrating the grooved joint adapter according to the exemplary embodiment of the present disclosure.

FIG. 2 is an elevation view illustrating the grooved joint adapter 1 according to the exemplary embodiment of the present disclosure, in which the cylindrical body 10 and the pipe socket 20 are connected via the first and second coupling portions 14 and 21, and connection pipes are connected to the upper portion of the cylindrical body 10 and the lower portion of the pipe socket 20, respectively.

Figure 3:
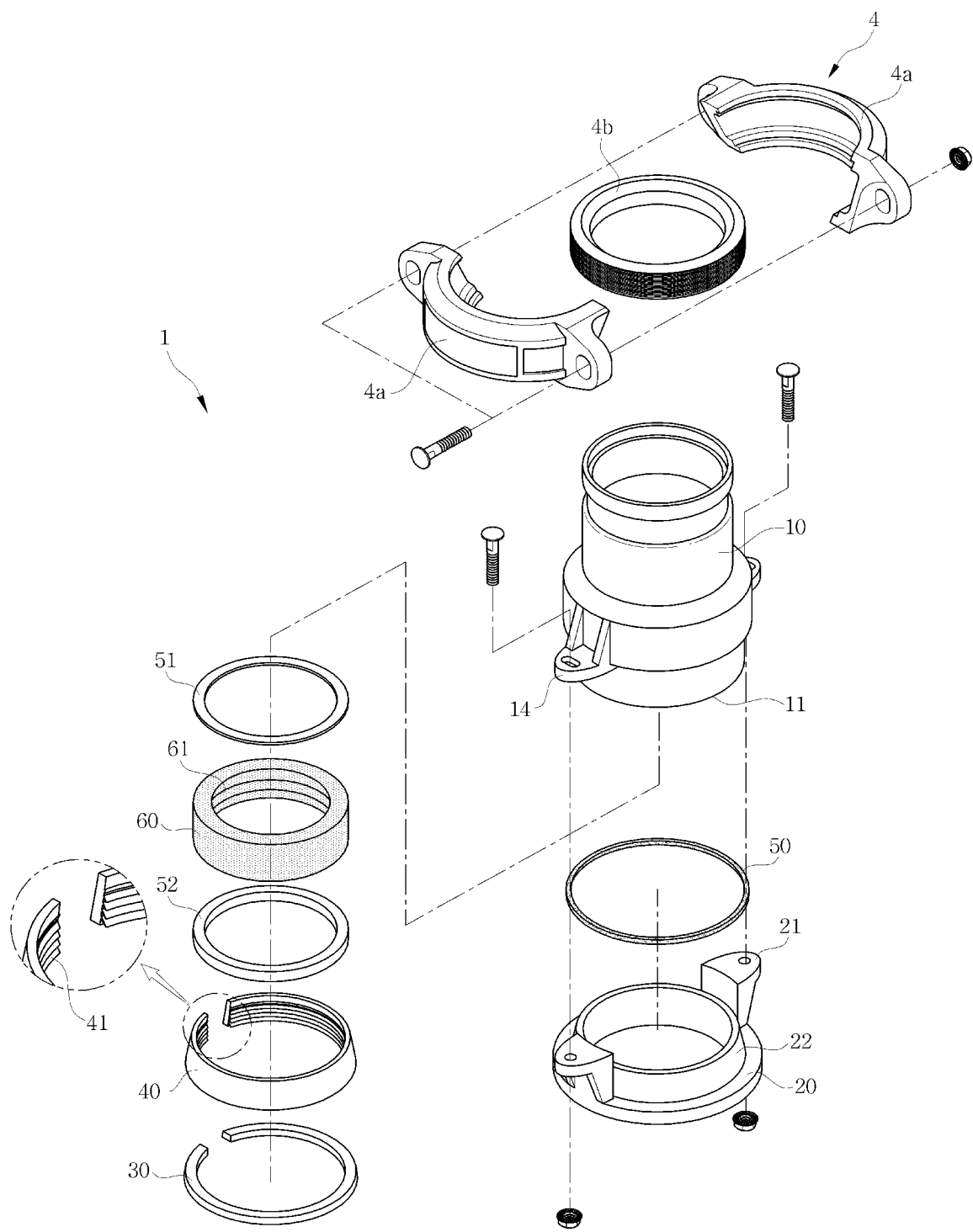
FIG. 3 is an exploded perspective view illustrating the grooved joint adapter according to the exemplary embodiment of the present disclosure.

FIG. 3 is an exploded perspective view illustrating the grooved joint adapter 1 according to the exemplary embodiment of the present disclosure, in which a grooved joint 4 is disposed on the upper portion of the cylindrical body 10, the pipe socket 20 is disposed on the lower portion of the cylindrical body 10, and a leakage prevention ring 50, a pressure ring 30, a stopper ring 40, a rubber-ring compression ring 52, a rubber ring 60, and a rubber-ring cover ring 51 are sequentially disposed between the cylindrical body 10 and the pipe socket 20.

Figure 4:
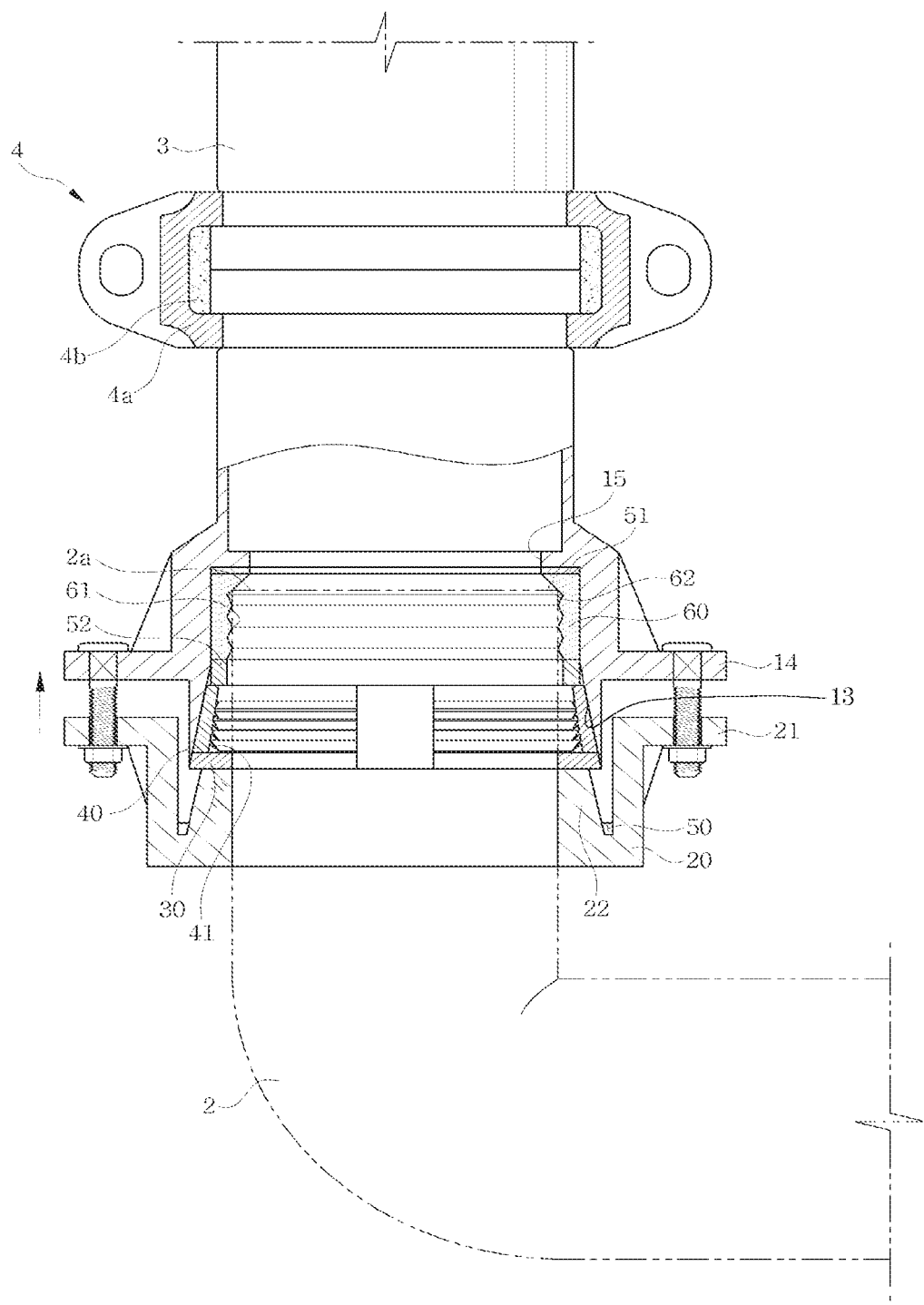
FIG. 4 is a cross-sectional view illustrating a connection state using the grooved joint adapter according to the exemplary embodiment of the present disclosure.

FIG. 4 is a cross-sectional view illustrating the grooved joint adapter 1 according to the exemplary embodiment of the present disclosure, in which one connection pipe is connected to the upper portion of the cylindrical body 10 via the grooved joint 4, and the other connection pipe is connected to the cylindrical body 10 through the stopper ring 40 pressed through the pipe socket 20 and the rubber ring 60 expanding while being compressed.

Figure 5:
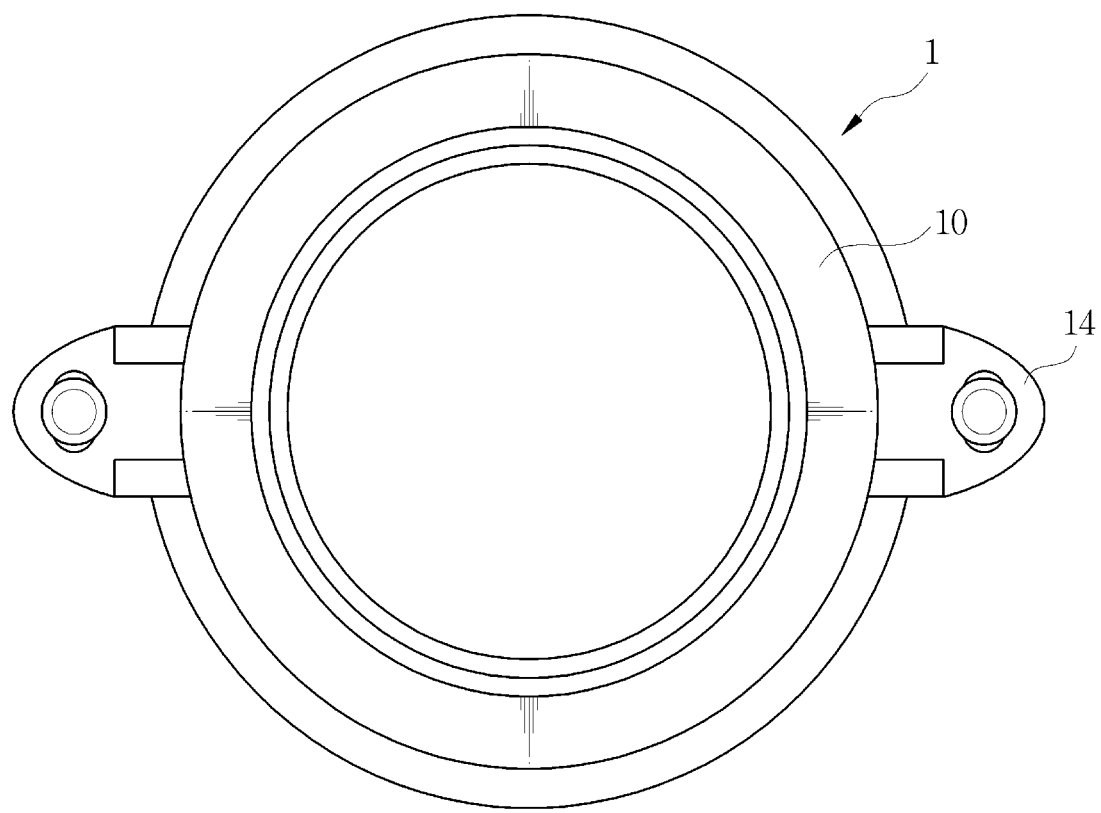
FIGS. 5 and 6 are plan views illustrating the grooved joint adapter according to the exemplary embodiment of the present disclosure.

FIG. 5 is a plan view illustrating the grooved joint adapter 1 according to the exemplary embodiment of the present disclosure, in which the first coupling portions 14 are provided on both outer surfaces of the cylindrical body 10.

Here, the drawings are not to be construed as limiting an implementation direction of the grooved joint adapter 1, according to the exemplary embodiment of the present disclosure. That is, the grooved joint adapter 1 may be implemented in a vertical direction, a horizontal direction, or a diagonal direction, as commonly understood. The cylindrical body 10 may have a linear shape, an elbow shape, or a T shape. The shapes should be construed to be equivalent to each other.

Hereinafter, for ease of description and understanding with reference to drawings, descriptions will be provided based on the vertical direction in which the cylindrical body 10 and the pipe socket 20 are sequentially disposed downwardly.

As illustrated in FIGS. 1 to 5, the grooved joint adapter 1 according to the exemplary embodiment of the present disclosure includes the cylindrical body 10 connecting two connection pipes, such as steel pipes, copper pipes, cast iron pipes, stainless steel pipes, or PVC pipes. Hereinafter, for ease of description and understanding, the two connection pipes will be referred to as the first connection pipe 2 and the second connection pipe 3, respectively.

The cylindrical body 10 has an insertion port 11 formed in the lower end thereof and a groove 12 formed on an outer peripheral surface of the upper end thereof. One end 2a of the first connection pipe 2 is inserted into the insertion port 11. The first connection pipe 2 may be a linear pipe, a T-shaped pipe, or a curved or bent pipe including an elbow, when viewed in the drawings. The second connection pipe 3, for example, a linear pipe, is connected to the groove 12.

In addition, the cylindrical body 10 has a guide portion 13 defined by the lower interior surface thereof to spread downwardly in a diagonal direction and connected to the insertion port 11. The first coupling portions 14 are formed on both outer surfaces of the cylindrical body 10, such that coupling means are coupled thereto. Typical coupling means may be combinations of a bolt and a general nut or combinations of a bolt and a lock nut referred to as a flange nut. A fixing portion 15 protrudes from an inner peripheral surface of the cylindrical body 10 to function as a type of partition.

Each of the first coupling portions 14 has a hole, for example, an oval hole, preventing a bolt head from rotating, such that bolt-coupling is performed by turning a nut. Ribs 14a are formed between the coupling portions 14 and the cylindrical body 10 to prevent the first coupling portions 14 from warping or being damaged during bolt-coupling.

The first coupling portions 14 are formed on the both outer surfaces of the cylindrical body 10, in a direction intersecting the lengthwise direction of the cylindrical body 10. The lower end and the upper end of the cylindrical body 10, on both sides of the fixing portion 15, may have the same diameter of different diameters. Specifically, the diameter of the lower end of the cylindrical body 10, in which the insertion port 11 is formed, may be the same as or smaller than that of the upper end of the cylindrical body 10, in which the groove 12 is formed.

The lower end and the upper end of the cylindrical body 10 are the same as or different from each other, such that the first and second connection pipes 2 and 3 can be easily connected at a work site, even in the case in which the first and second connection pipes 2 and 3 have the same or different outer diameters.

In addition, the cylindrical body 10 may be formed by casting, for example, cast iron, steel, or stainless steel. Therefore, according to embodiments of the present disclosure, it is possible to prevent the occurrence of problems related to damage during a connection operation and durability after the connection operation.

The grooved joint adapter 1 includes the pipe socket 20. The pipe socket 20 has the second coupling portions 21 formed on both outer surfaces thereof and bolt-coupled to the first coupling portions 14, such that the pipe socket 20 is coupled to the inner wall of the cylindrical body 100 in the lengthwise direction thereof, and a protrusion 22 is formed on the upper surface thereof and inserted into the cylindrical body 10 through the insertion port 11.

In addition, the grooved joint adapter 1 includes the pressure ring 30 and the stopper ring 40. The pressure ring 30 is disposed on a portion of the cylindrical body 10, adjacent to the insertion port 11, and has both ends separated from each other. The pressure ring 30 is slid toward the fixing portion 15 along the guide portion 13 through the protrusion 22 when the first and second coupling portions 14 and 21 are bolt-coupled. The stopper ring 40 is disposed inside of the guide portion 13, has both ends separated from each other, and has one or more wedge sawteeth 41 formed on the inner peripheral surface thereof, which spread downwardly, to grip the outer peripheral surface of the first connection pipe 2.

The pipe socket 20 is an element connecting the first connection pipe 2 to the cylindrical body 10 by pressing. In the same manner as in the cylindrical body 10, the pipe socket 20 may be formed by casting, for example, cast iron, steel, or stainless steel, but the present disclosure is not necessarily limited thereto.

The pipe socket 20 has ribs 21a formed between the both outer surfaces thereof and the second coupling portions 21 to prevent the second coupling portions 21 from warping or being damaged to during coupling of a nut and a bolt. The protrusion 22 may be formed in a conical shape on the upper surface of the pipe socket 20 and thus may be easily inserted, through the insertion port 11, into the lower portion of the cylindrical body 10 having the guide portion 13.

The pressure ring 30 has both ends separated from each other like a common snap ring, is disposed on the insertion port 11 side of the cylindrical body 10, and is slid toward the fixing portion 15 along the guide portion 13 through the protrusion 22 when the first and second coupling portions 14 and 21 are bolt-coupled. The pressure ring 30 may be formed, for example, from stainless steel, unlikely to be corroded due to contact with moisture, but the present disclosure is not necessarily limited thereto.

The stopper ring 40, sliding along the guide portion 13 in the same direction as in the sliding movement of the pressure ring 30, also has both ends separated from each other, is formed from stainless steel, and is disposed inside of the guide portion 13.

Here, one or more wedge sawteeth 41 formed on the inner peripheral surface of the stopper ring 40 protrude, for example, downwardly in the diagonal direction of the stopper ring 40 to grip the outer peripheral surface of the first connection pipe 2 introduced through the insertion port 11.

In addition, the wedge sawteeth 41 are provided as two or more wedge sawteeth 41 on the inner peripheral surface of the stopper ring 40 to more easily grip the first connection pipe 2. In this case, the two or more wedge sawteeth 41 may be disposed in opposite directions.

Accordingly, according to an embodiment of the present disclosure, it is possible to effectively prevent the separation of the first connection pipe 2 by gripping the outer peripheral surface of the first connection pipe 2, inserted into the cylindrical pipe 10, using the two or more wedge sawteeth 41.

The grooved joint adapter 1 includes the rubber ring 60. The rubber ring 60 is disposed above the stopper ring of the stopper ring 40 and below the fixing portion 15 in the drawings and has an uneven portion 61 formed therein and a stopper portion 62 protruding inward and closely contacting the end 2a of the first connection pipe 2. The uneven portion 61 may be interpreted as a wrinkled portion including, for example, ridges and grooves.

That is, the rubber ring 60 relatively expands in a widthwise direction thereof, while being compressed in a lengthwise direction thereof when pressed through the pipe socket 20, so that the uneven portion 61 of the rubber ring 60 grips the outer peripheral surface of the first connection pipe 2 and concurrently prevents a leakage of water and noise caused by vibrations or the like.

The stopper portion 62 formed on the upper end of the rubber ring 60 may be tapered from the lower end thereof to the upper end thereof, thereby allowing an insertion position of the end 2a of the first connection pipe 2 to be easily determined therethrough.

Therefore, according to an embodiment of the present disclosure, due to the rubber ring 60, the insertion position of the first connection pipe 2 can be determined, and the outer peripheral surface thereof can be easily gripped and fixed. Further, a space can be formed between the uneven portion 61 and the first connection pipe 2 to absorb sound, thereby effectively preventing noise.

The grooved joint adapter 1 may further include the leakage prevention ring 50, the rubber-ring cover ring 51, and the rubber-ring compression ring 52. The leakage prevention ring 50 is interposed between the cylindrical body 10 and the pipe socket 20 to prevent a leakage of water. The rubber-ring cover ring 51 interposed between the cylindrical body 10 and the rubber ring 60 and protecting the rubber ring 60. The rubber-ring compression ring 52 is interposed between the rubber ring 60 and the stopper ring 40 to press and compress the rubber ring 60 when the stopper ring 40 slides.

That is, the leakage prevention ring 50 makes it possible to prevent a leakage phenomenon in which fluid flows between the cylindrical body 10 and the pipe socket 20 or the rubber ring 60. The leakage prevention ring 50 may be referred to as a packing ring. The rubber-ring cover ring 51 may lengthen a lifespan of the rubber ring 60 by protecting the rubber ring 60, which expands while being compressed.

Here, the rubber-ring compression ring 52 has a rectangular cross-section such that the lower end thereof closely contacts the stopper ring 40 and the upper end thereof closely contacts the rubber ring 60, and upwardly compresses the rubber ring 60 to expand the rubber ring 60 when the stopper ring 40 slides. The rubber-ring compression ring 52 may be selectively used according to the inner diameter of the first connection pipe 2 and the degree of flux pressure of fluid.

Therefore, according to an embodiment of the present disclosure, the leakage prevention ring 50 can prevent a leakage of water using, and the rubber-ring cover ring 51 can increase the lifespan of the rubber ring 60 by protecting the rubber ring 60. Further, it is possible to easily compress the rubber ring 60 using the rubber-ring compression ring 52, thereby effectively preventing the first connection pipe 2 from being separated.

Hereinafter, a method of connecting the first and second connection pipes 2 and 3 via the grooved joint adapter 1 according to the exemplary embodiment of the present disclosure will be described in detail.

As illustrated in FIGS. 3 and 4, in the grooved joint adapter 1 according to the exemplary embodiment of the present disclosure, the first connection pipe 2 and the second connection pipe 3 are connected by inserting the end 2a of the first connection pipe 2 through the insertion port 11 formed in the lower end of the cylindrical body 10 until the end 21 contacts the stopper portion of the rubber ring 60, and then, connecting the second connection pipe 3 to the cylindrical body 10 through the groove 12 formed on the upper end of the cylindrical body 10.

The cylindrical body 10 and the second connection pipe 3 may be connected, for example, via the common grooved joint 4. That is, the upper end of the cylindrical body 10 and the second connection pipe 3 are connected in the lengthwise direction thereof by coupling a joint coupling 4a provided in a ring gasket 4b to a connection portion defined by connecting the second connection pipe 3 to the upper end of the cylindrical body 10.

Since the grooved joint 4 including the ring gasket 4b and the joint coupling 4b is a known element and can be easily implemented without further detailed descriptions, descriptions thereof will be omitted.

When the connection between the upper end of the cylindrical body 10 and the second connection pipe 3 is completed via the grooved joint 4, the end 2a of the first connection pipe 2 is inserted into the insertion port 11 formed in the lower end of the cylindrical body 10.

Thereafter, as the first coupling portions 12 formed on the cylindrical body 10 and the second coupling portions 21 formed on the pipe socket 20 are pressed against each other by bolt-coupling, the protrusion 22 formed on the pipe socket 20 presses the pressure ring 30. This consequently drives the pressure ring 30 and the stopper ring 40 to slide along the guide portion 13 while contracting the pressure ring 30 and the stopper ring 40 so that both separated ends thereof approach to each other.

That is, the one or more wedge sawteeth 41 firstly fix the first connection pipe 2 by gripping the outer peripheral surface of the first connection pipe 2, due to the contraction and the sliding of the stopper ring 40, and then, secondly fix the first connection pipe 2 by gripping the outer peripheral surface of the first connection pipe 2, due to the sliding movement of the stopper ring 40, as well as the expansion of the rubber ring 60 while being compressed by the rubber-ring compression ring 52.

Therefore, according to embodiments of the present disclosure, the first and second connection pipes 2 and 3 can be easily connected without forming grooves in ends thereof, formability and productivity can be excellent and costs can be reduced. Furthermore, since grooving is not performed, pipes formed from different materials can be easily connected when outer diameters thereof match each other. Accordingly, it is very effective in terms of construction convenience.

Figure 6:
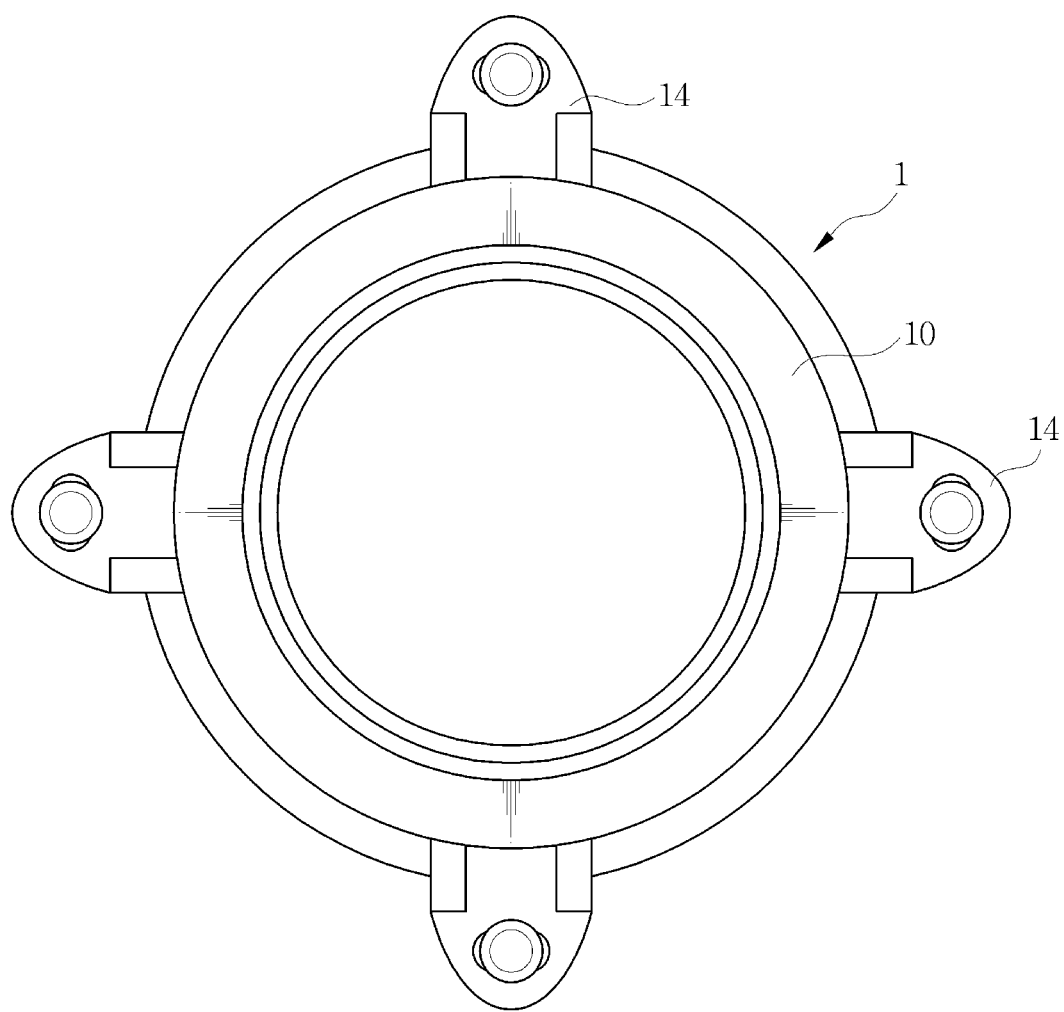

FIG. 6 is a plan view illustrating the grooved joint adapter 1 according to the exemplary embodiment of the present disclosure, in which the first coupling portions 14 are provided in a cross-shaped arrangement on outer portions of the cylindrical body 10, such that the grooved joint adaptor 1 can properly hold connection pipes having a large inner diameter.

As illustrated in FIG. 6, when a first connection pipe has a large outer diameter, for example, of about 150 mm or more, or a fluid flows at a high pressure through the first connection pipe, the first coupling portions 14 of the grooved joint adapter 1 according to the exemplary embodiment of the present disclosure may be provided in the cross-shaped arrangement on the outer portions of the cylindrical body 10. In addition, the second coupling portions 21 on the pipe socket 20 may also be provided in a cross-shaped arrangement, corresponding to the arrangement of the first coupling portions 14.

Although the exemplary embodiments of the present disclosure have been described in detail, this is for illustrative purposes only. The groove joint adaptor according to the present disclosure is not limited thereto. The foregoing descriptions and the accompanying drawings have been presented in order to explain certain principles of the present invention. It will be understood that the terms "comprise", "include", and "have", used herein specify the presence of stated elements but do not preclude the presence or addition of any other elements unless explicitly noted. Unless otherwise defined, all terms including technical and scientific terms used herein have the same meaning as that which would be commonly understood by a person skilled in the art to which the present invention pertains. It will be further understood that terms, such as those defined in commonly used dictionaries, should be interpreted as having a meaning that is consistent with their meaning in the context of the relevant art, and will not be interpreted in an idealized or overly formal sense, unless expressly so defined herein.

The foregoing descriptions and the accompanying drawings have been presented in order to explain the certain principles of the present invention. A person skilled in the art to which the present invention pertains could make many modifications and variations by combining, dividing, substituting for or changing elements without departing from the principle of the present invention. The foregoing embodiments disclosed herein shall be interpreted as illustrative only, rather than being limitative of the principle and scope of the present invention. It should be understood that the scope of the present invention shall be defined by the appended Claims and all of their equivalents fall within the scope of the present invention.

What is claimed is:

1. A grooved joint adapter comprising:
   a cylindrical body having an insertion port formed in one end thereof, such that an end of a connection pipe is inserted into the insertion port, a groove formed in an outer peripheral surface of the other end thereof, a guide portion defined by an interior thereof to spread outwardly in a diagonal direction and connected to the insertion port, first coupling portions formed on both outer surfaces thereof, and a fixing portion protruding from an inner peripheral surface thereof;
   a pipe socket having second coupling portions formed on both outer surfaces thereof, such that the first coupling portions are bolt-coupled to the second coupling portions, and a protrusion formed on one surface thereof and inserted into the cylindrical body through the insertion port;
   a pressure ring disposed on a portion of the cylindrical body, adjacent to the insertion port, and having both ends separated from each other, wherein the pressure ring slides toward the fixing portion along the guide portion through the protrusion when the first and second coupling portions are bolt-coupled;
   a stopper ring disposed inside of the guide portion, having both ends separated from each other, and having one or more wedge sawteeth formed on an inner peripheral surface thereof in a diagonal direction thereof to grip an outer peripheral surface of the connection pipe, wherein the stopper ring slides along the guide portion when the pressure ring slides through the protrusion; and
   a rubber ring disposed inside of the cylindrical body, having an uneven portion formed on an inner peripheral surface thereof, and having a stopper portion protruding inward and closely contacting the end of the connection pipe, wherein the rubber ring expands while being compressed to grip the connection pipe,
   wherein the groove includes a base having a first outer diameter and sidewalls on opposite sides of the base, each sidewall having an outer diameter larger than the first outer diameter of the base,
   wherein the guide portion of the cylindrical body spreads outwardly in the diagonal direction, such that an inner diameter of the guide portion at a first end of the guide portion is less than an inner diameter of the guide portion at a second end of the guide portion, the first end of the guide portion being closer to the one end of the cylindrical body than the second end of the guide portion, and
   wherein an outer circumferential surface of the stopper ring spreads outwardly in the diagonal direction and is in contact with the guide portion of the cylindrical body along an entire length of the stopper ring.

2. The grooved joint adapter according to claim 1, wherein a diameter of the one end of the cylindrical body, in which the insertion port is formed, is greater than the diameter of the other end of the cylindrical body, in which the groove is formed.

3. The grooved joint adapter according to claim 1, wherein the one or more wedge sawteeth are provided as two or more wedge sawteeth and are disposed in opposite directions.

4. The grooved joint adapter according to claim 1, further comprising:
   a leakage prevention ring interposed between the cylindrical body and the pipe socket;
   a rubber-ring cover ring interposed between the cylindrical body and the rubber ring; and
   a rubber-ring compression ring interposed between the rubber ring and the stopper ring.

5. The grooved joint adapter according to claim 1, wherein the connection pipe comprises a linear pipe, a T-shaped pipe, or a curved or bent pipe comprising an elbow.

* * * * *